(12) United States Patent
Zhu

(10) Patent No.: US 9,852,294 B1
(45) Date of Patent: *Dec. 26, 2017

(54) SYSTEMS AND METHODS FOR DETECTING SUSPICIOUS APPLICATIONS BASED ON HOW ENTRY-POINT FUNCTIONS ARE TRIGGERED

(71) Applicant: Symantec Corporation, Mountain View, CA (US)

(72) Inventor: Xiaole Zhu, Culver City, CA (US)

(73) Assignee: Symantec Corporation, Mountain View, CA (US)

(*) Notice: Subject to any disclaimer, the term of this patent is extended or adjusted under 35 U.S.C. 154(b) by 206 days.

This patent is subject to a terminal disclaimer.

(21) Appl. No.: 14/313,739

(22) Filed: Jun. 24, 2014

(51) Int. Cl.
*G06F 7/04* (2006.01)
*G06F 21/56* (2013.01)
*G06F 21/57* (2013.01)
*H04L 29/06* (2006.01)

(52) U.S. Cl.
CPC .......... *G06F 21/562* (2013.01); *G06F 21/577* (2013.01); *H04L 63/1416* (2013.01); *H04L 63/1433* (2013.01)

(58) Field of Classification Search
CPC ..... H04L 63/20; H04L 63/10; H04L 63/1433; H04L 63/1416; G06F 11/008; G06F 21/577; G06F 21/563
See application file for complete search history.

(56) References Cited

U.S. PATENT DOCUMENTS

| 8,141,149 | B1  | 3/2012  | Henry et al.           |
|-----------|-----|---------|------------------------|
| 8,224,796 | B1* | 7/2012  | Shinde ............. G06F 17/30117 |
|           |     |         | 707/695                |
| 8,671,455 | B1  | 3/2014  | Zhu et al.             |
| 8,726,386 | B1  | 5/2014  | McCorkendale et al.    |
| 8,756,432 | B1  | 6/2014  | Chen et al.            |
| 9,208,322 | B1* | 12/2015 | Ma ........................ G06F 21/577 |

(Continued)

OTHER PUBLICATIONS

Jun Mao; Systems and Methods for Optimizing Scans of Pre-Installed Applications; U.S. Appl. No. 14/190,471, filed Feb. 26, 2014.

(Continued)

*Primary Examiner* — Eleni Shiferaw
*Assistant Examiner* — Gregory M Elmore
(74) *Attorney, Agent, or Firm* — FisherBroyles, LLP

(57) ABSTRACT

The disclosed computer-implemented method for detecting suspicious applications based on how entry-point functions are triggered may include (1) identifying an application that is capable of accessing a data-access Application Programming Interface (API) programmed to provide access to sensitive information located on a computing system and/or a data-transfer API programmed to send information outside of the computing system, (2) identifying an entry-point function of the application whose execution results in a call to the data-access API and/or the data-transfer API, (3) determining how the entry-point function is triggered, (4) determining whether the application is suspicious based on how the entry-point function is triggered, and (5) performing a security action based on whether the application is suspicious. Various other methods, systems, and computer-readable media are also disclosed.

20 Claims, 7 Drawing Sheets

(56) References Cited

U.S. PATENT DOCUMENTS

| | | | |
|---|---|---|---|
| 2006/0070112 A1 | 3/2006 | LaMacchia et al. | |
| 2008/0086640 A1 | 4/2008 | Voss et al. | |
| 2010/0083240 A1* | 4/2010 | Siman | G06F 8/433 717/144 |
| 2010/0180344 A1* | 7/2010 | Malyshev | G06F 21/566 726/23 |
| 2011/0173693 A1* | 7/2011 | Wysopal | G06F 11/3612 726/19 |
| 2013/0055401 A1* | 2/2013 | Kim | G06F 21/52 726/25 |
| 2013/0152154 A1* | 6/2013 | Xiao | G06F 21/00 726/1 |
| 2013/0227683 A1* | 8/2013 | Bettini | G06F 21/57 726/22 |
| 2013/0347094 A1* | 12/2013 | Bettini | H04L 63/0245 726/11 |
| 2014/0006616 A1* | 1/2014 | Aad | G06F 21/552 709/225 |
| 2014/0020046 A1* | 1/2014 | Heitzman | G06F 8/75 726/1 |
| 2014/0310813 A1* | 10/2014 | Murthy | G06F 11/3644 726/25 |
| 2016/0057159 A1* | 2/2016 | Yin | H04L 63/145 726/23 |

OTHER PUBLICATIONS

Yong Ling Xue; Systems and Methods for Pre-Installation Detection of Malware on Mobile Devices; U.S. Appl. No. 14/205,316, filed Mar. 11, 2014.

James E. Brennan, et al.; Systems and Methods for Managing Encrypted Files Within Application Packages; U.S. Appl. No. 14/155,792, filed Jan. 15, 2014.

"T.J. Watson Libraries for Analysis (WALA)", http://wala.sourceforge.net/wiki/index.php/Main_Page, as accessed May 5, 2014, (Jan. 4, 2007).

Zheng, Cong et al., "SmartDroid: an Automatic System for Revealing UI-based Trigger Conditions in Android Applications", http://faculty.cs.tamu.edu/guofei/paper/SmartDroid-SPSM12.pdf, as accessed May 5, 2014, SPSM'12, Raleigh, North Carolina, USA, (Oct. 19, 2012).

"Input Events", http://developer.android.com/guide/topics/ui/ui-events.html, as accessed May 5, 2014, (Feb. 13, 2009).

Fuchs, Adam P., et al., "SCanDroid: Automated Security Certification of Android Applications", https://www.cs.umd.edu/~avik/papers/scandroidascaa.pdf, as accessed May 5, 2014, (May 9, 2010).

Enck, William et al., "TaintDroid: An Information-Flow Tracking System for Realtime Privacy Monitoring on Smartphones", http://appanalysis.org/tdroid10.pdf, 9th USENIX Symposium on Operating Systems Design and Implementation (OSDI' 10), Oct. 4-6, 2010.

* cited by examiner

SYSTEMS AND METHODS FOR DETECTING SUSPICIOUS APPLICATIONS BASED ON HOW ENTRY-POINT FUNCTIONS ARE TRIGGERED

BACKGROUND

Today, mobile computing devices (such as smartphones and tablets) are as popular for use as communication tools as they are for creating, managing, and interacting with digital information. For example in addition to enabling users to communicate via phone call, text message, and email, mobile computing devices are used to manage contact lists, social networks, and calendars, view and create notes and documents, browse the Internet, record video and audio, take photographs, and make purchases. Consequently, mobile computing devices often contain a considerable amount of sensitive information.

Knowing this, unscrupulous developers have begun creating malicious applications (e.g., malware or grayware) that can collect and leak sensitive information and/or perform other malicious actions without the knowledge or explicit permission of the application's users. These malicious applications may end up being readily available through popular application store services, where individuals seeking to enhance the functionality of their mobile computing devices may inadvertently download and install them. In some situations, a user may install an application and provide the application with permissions that enable the application to access and leak sensitive information and/or perform other malicious behaviors (e.g., sending malicious text messages) without understanding that the application is designed to do so. Accordingly, the instant disclosure addresses a need for systems and methods that detect suspicious applications.

SUMMARY

As will be described in greater detail below, the instant disclosure describes various systems and methods for detecting suspicious applications based on how entry-point functions are triggered. In one example, a computer-implemented method for detecting suspicious applications based on how entry-point functions are triggered may include (1) identifying an application that is capable of accessing a data-access Application Programming Interface (API) (or source API) programmed to provide access to sensitive information located on a computing system and/or a data-transfer API (or sink API) programmed to send information outside of the computing system, (2) identifying an entry-point function of the application whose execution results in a call to the data-access API and/or the data-transfer API, (3) determining how the entry-point function is triggered (e.g., by determining that the entry-point function is a user-initiated function or a automatically initiated function), (4) determining whether the application is suspicious based on how the entry-point function is triggered, and (5) performing a security action based on whether the application is suspicious.

In some embodiments, the step of identifying the entry-point function may include (1) building a data-flow graph that includes a leak path from the data-access API to the data-transfer API and (2) analyzing the data-flow graph to determine that execution of the entry-point function results in the leak path from the data-access API to the data-transfer API.

In some embodiments, the step of identifying the application may include determining that the application is capable of leaking sensitive information outside of the computing system via the data-access API and the data-transfer API, and the step of identifying the entry-point function may include determining that the execution of the entry-point function results in a call to both of the data-access API and the data-transfer API.

In some embodiments, the step of determining how the entry-point function is triggered may include determining a trigger-type classification of the entry-point function. In various embodiments, the step of determining the trigger-type classification of the entry-point function may include determining that the entry-point function is a user-initiated function or an automatically-initiated function.

In some embodiments, the step of determining how the entry-point function is triggered may include determining that the entry-point function is not triggered in response to a user's interaction with the application, and the entry-point function may be determined to be suspicious based on determining that the entry-point function is not triggered in response to a user's interaction with the application.

In some embodiments, the step of performing the security action may include labeling the application as suspicious and/or informing a user that the application may leak the user's sensitive information without the user interacting with the application. In some embodiments, the steps of identifying the entry-point function and determining how the entry-point function is triggered may be performed as part of a static data-flow analysis of the application.

In certain embodiments, the data-access API may include an account access API, a browser-bookmark access API, a browser-history access API, a calendar access API, a camera access API, a contact access API, a location access API, a message access API, an external-storage access API, a microphone access API, and/or a phone-call access API. In some embodiments, the data-transfer API may include a message transfer API, a network transfer API, and/or a phone-call transfer API.

In one embodiment, a system for implementing the above-described method may include (1) an application-identifying module, stored in memory, that identifies an application that is capable of accessing a data-access API programmed to provide access to sensitive information located on a computing device and/or a data-transfer API programmed to send information outside of the computing device, (2) a function-identifying module, stored in memory, that identifies an entry-point function of the application whose execution results in a call to the data-access API and/or the data-transfer API, (3) a trigger-determining module, stored in memory, that determines how the entry-point function is triggered, (4) a suspicion-determining module, stored in memory, that determines whether the application is suspicious based on how the entry-point function is triggered, (5) a security module, stored in memory, that performs a security action based on whether the application is suspicious, and (6) at least one processor that executes the application-identifying module, the function-identifying module, the trigger-determining module, the suspicion-determining module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an application that is capable of accessing a data-access API programmed to provide access to sensitive information located on a computing system and/or a data-transfer API programmed to send information outside of the computing system, (2) identify an entry-point function of the application whose execution results in a call to the data-access API and/or the data-transfer API, (3) determine how the entry-point function is triggered, (4) determine whether the application is suspicious based on how the entry-point function is triggered, and (5) perform a security action based on whether the application is suspicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
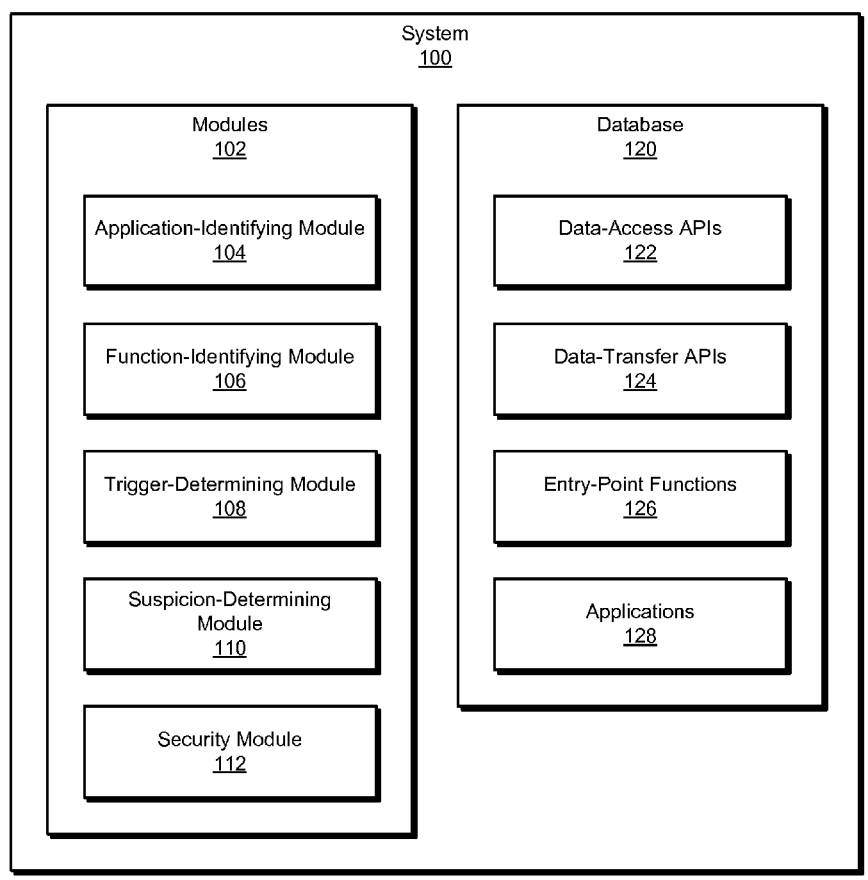
FIG. 1 is a block diagram of an exemplary system for detecting suspicious applications based on how entry-point functions are triggered.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting suspicious applications based on how entry-point functions are triggered. As will be explained in greater detail below, by analyzing how entry-point functions whose execution may result in sensitive information leaks and/or other malicious behaviors are triggered, the systems and methods described herein may efficiently and effectively detect malware and/or grayware. For example, the systems and methods described herein may determine that an application is or is likely malware or grayware by determining that one or more of the application's entry-point functions are not triggered in response to a user interacting with the application and may, when executed, result in sensitive information being leaked and/or other malicious behaviors being performed by the application. Embodiments of the instant disclosure may also provide various other advantages and features, as discussed in greater detail below.

Figure 2:
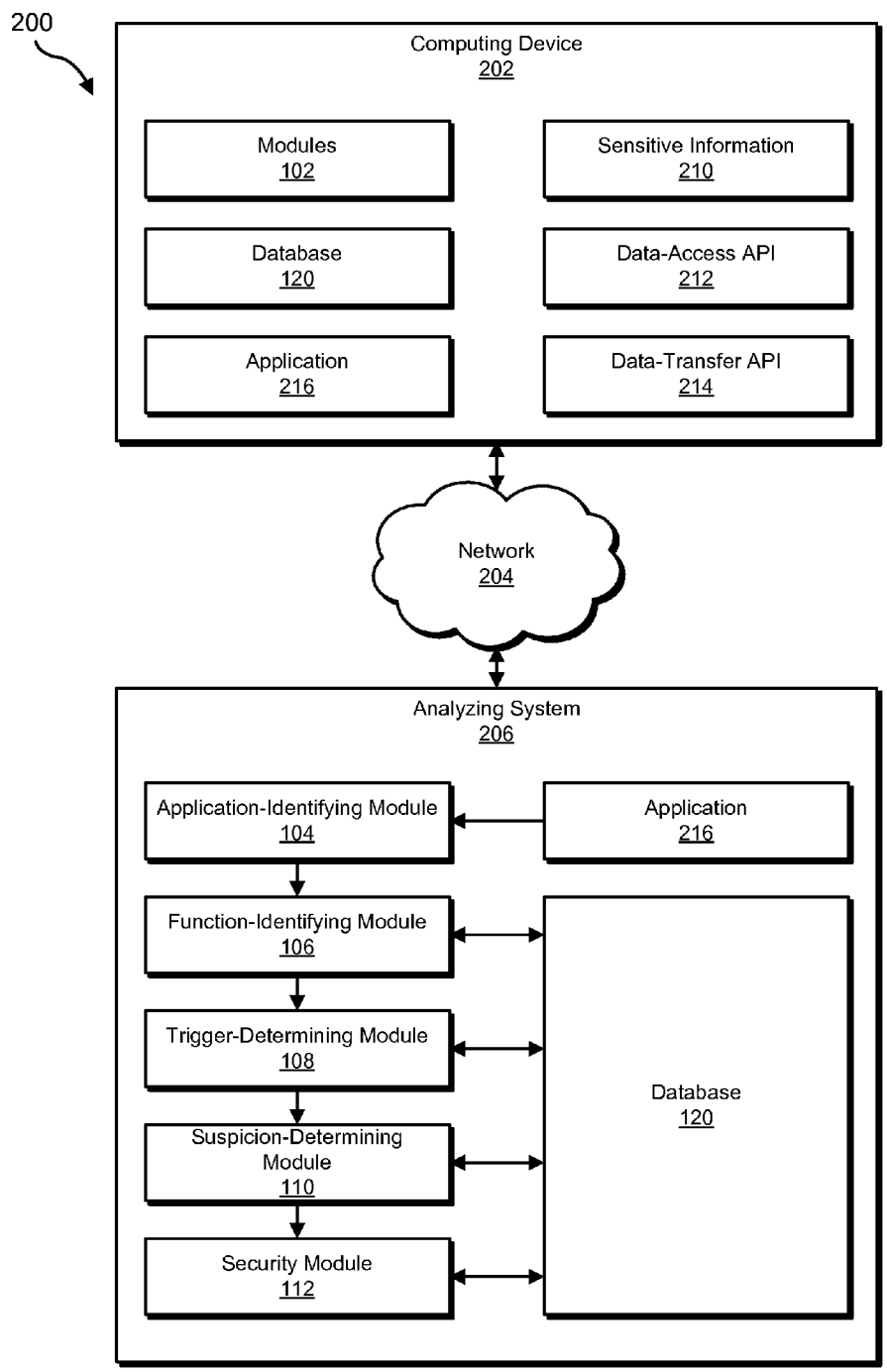
FIG. 2 is a block diagram of an additional exemplary system for detecting suspicious applications based on how entry-point functions are triggered.

The following will provide, with reference to FIGS. 1-2, detailed descriptions of exemplary systems for detecting suspicious applications based on how entry-point functions are triggered. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting suspicious applications based on how entry-point functions are triggered. As illustrated in this figure, exemplary system 100 may include one or more modules 102 for performing one or more tasks. For example, and as will be explained in greater detail below, exemplary system 100 may include an application-identifying module 104 that identifies an application that is capable of accessing a data-access API programmed to provide access to sensitive information located on a computing device and/or a data-transfer API programmed to send information outside of the computing device. Exemplary system 100 may also include a function-identifying module 106 that identifies an entry-point function of the application whose execution results in a call to the data-access API and/or the data-transfer API.

In addition, and as will be described in greater detail below, exemplary system 100 may include a determining module 108 that determines how the entry-point function is triggered. Exemplary system 100 may also include a suspicion-determining module 110 that determines whether the application is suspicious based on how the entry-point function is triggered. Exemplary system 100 may further include a security module 112 that performs a security action based on whether the application is suspicious. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or analyzing system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may store information about one or more data-access APIs (e.g., data-access APIs 122), information about one or more data-transfer APIs (e.g., data-transfer APIs 124), information about one or more entry-point functions (e.g., entry-point functions 126), and/or information about one or more applications (e.g., applications 128).

Database 120 may represent portions of a single database or computing device or a plurality of databases or computing devices. For example, database 120 may represent a portion of computing device 202 and/or analyzing system 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing device 202 and/or analyzing system 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an analyzing system 206 via a network 204. In one example, computing device 202 may be programmed with one or more of modules 102 and/or may store all or a portion of the data in database 120. Additionally or alternatively, analyzing system 206 may be programmed with one or more of modules 102 and/or may store all or a portion of the data in database 120.

Computing device 202 generally represents any type or form of computing device capable of reading computer-executable instructions and detecting suspicious applications based on how entry-point functions are triggered. Examples of computing device 202 include, without limitation, laptops, smartphones, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. In at least one example, computing device 202 may represent a computing device on which sensitive information is accessible to third-party applications via various data-access APIs and from which third-party applications may send information via various data-transfer APIs. As shown in FIG. 2, computing device 202 may include sensitive information 210 (e.g., sensitive information belonging to a user of computing device 202). Computing device 202 may also include application programming interfaces (e.g., data-access API 212 and data-transfer API 214) that enable applications (e.g., application 216) installed on computing device 202 to access sensitive information 210 and/or send information outside of computing device 202.

Analyzing system 206 generally represents any type or form of computing device that is capable of reading computer-executable instructions and detecting suspicious applications based on how entry-point functions are triggered. Examples of analyzing system 206 include, without limitation, application servers and database servers configured to run certain software applications and/or provide various database services. In at least one example, analyzing system 206 may represent a system (e.g., a cloud-based system) that analyzes applications that have been or may be installed on mobile computing devices. For example as illustrated in FIG. 2, analyzing system 206 may analyze application 216 before or after application 216 is installed on computing device 202.

Network 204 generally represents any medium or architecture capable of facilitating communication or data-transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data-transfer using wireless or wired connections. In one embodiment, network 204 may facilitate communication between computing device 202 and analyzing system 206.

In one embodiment, one or more of modules 102 from FIG. 1 may, when executed by at least one processor of computing device 202 and/or analyzing system 206, enable computing device 202 and/or analyzing system 206 to detect suspicious applications by detecting how entry-point functions of applications are triggered. For example, and as will be described in greater detail below, one or more of modules 102 may cause computing device 202 and/or analyzing system 206 to (1) identify application 216 that may be capable of accessing a data-access API (e.g., data-access API 212) programmed to provide access to sensitive information located on a computing system (e.g., computing device 202) and/or a data-transfer API (e.g., data-transfer API 214) programmed to send information outside of the computing system, (2) identify an entry-point function (e.g., entry-point function 402 in FIG. 4 or entry-point function 502 in FIG. 5) of application 216 whose execution results in a call to the data-access API and/or the data-transfer API, (3) determine how the entry-point function is triggered, and (4) determine whether the application is suspicious based on how the entry-point function is triggered, and (5) perform a security action based on whether the application is suspicious.

Figure 3:
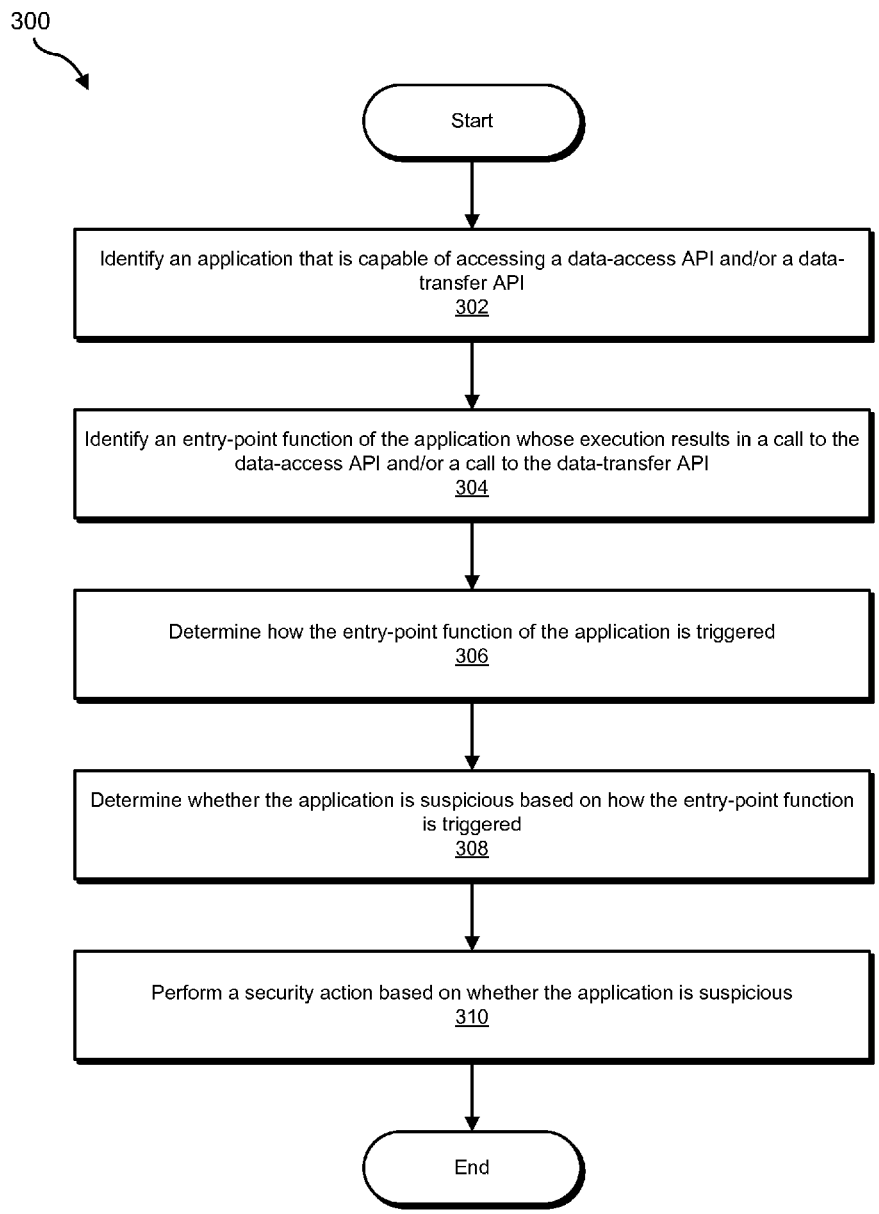
FIG. 3 is a flow diagram of an exemplary method for detecting suspicious applications based on how entry-point functions are triggered.

FIG. 3 is a flow diagram of an exemplary computer-implemented method 300 for detecting suspicious applications based on how entry-point functions are triggered. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify an application that is capable of accessing a data-access API and/or a data-transfer API. For example, application-identifying module 104 may, as part of analyzing system 206 in FIG. 2, identify application 216 that may be capable of accessing data-access API 212 and/or data-transfer API 214. In another example, application-identifying module 104 may, as part of computing device 202 in FIG. 2, identify application 216.

As used herein, the term "application" generally refers to any collection of computer-readable instructions and/or information used to distribute, install, and/or execute an application on a computing platform. As used herein, the term "computing platform" may refer to any computing device, software framework, operating system, and/or combination thereof. Examples of computing platforms include, without limitation, the ANDROID platform or the iOS platform. In some examples, the term "application" may refer to an application package file that has been created (e.g., for distribution purposes) by packaging, or "bundling," the individual components of the application into a single file (e.g., an ANDROID ".apk" file). Applications installed on certain computing platforms may access, share, and/or transfer information stored on the computing device via various data-access APIs and data-transfer APIs.

As used herein the term "data-access API" may refer to any function, code, interface, or other mechanism that an application may use to access information located on a computing device. In some examples, a data-access API may be a file that includes a set of rules and/or specifications that applications may use to access and/or share data. Examples of data-access APIs include, without limitation, an account-access API programmed to provide access to account information, a browser-bookmark access API programmed to provide access to browser bookmarks, a browser-history access API programmed to provide access to browsing histories, a calendar access API programmed to provide access to calendar events, a camera access API programmed to provide access to a camera sensor, a contact access API programmed to provide access to contact lists, a location access API programmed to provide access to location information, a message access API programmed to provide access to messages sent to or received by a computing device (e.g., text messages or email messages), an external-storage access API programmed to provide access to an external storage device (e.g., a memory card), an internal-storage API programmed to provide access to local memory, a log access API programmed to provide access to system logs, a microphone access API programmed to provide access to a microphone sensor, a phone-call access API programmed to provide access to phone-call information, an inter-process communication API programmed to allow two applications to exchange information, a third-party-application API programmed to provide access to third-party-application information, a data-access API with permission requirements, and/or any other data-access API programmed to allow direct or indirect access to sensitive information.

As used herein the term "data-transfer API" may refer to any function, code, interface, or other mechanism that an application may use to send information outside of a computing device. In some examples, a data-transfer API may be a file that includes a set of rules and/or specifications that software applications may use to transfer data outside of a computing device. Examples of data-transfer APIs include, without limitation, a message transfer API programmed to send messages (e.g., a Short Messaging Service (SMS) message, an Extended Messaging Service message, or a Multimedia Messaging Service (MMS) message) outside of a computing device, a network transfer API programmed to facilitate network transfers (e.g., Hypertext Transfer Protocol (HTTP) communications), a phone-call transfer API programmed to facilitate phone calls, an inter-process communication API programmed to allow two applications to exchange information, a third-party-application API programmed to enable one third-party application to provide data-transfer services to other third-party-applications, a data-transfer API with permission requirements, and/or any other data-transfer API programmed to allow information to be transferred outside of a computing device.

In some instances, the information that is accessible to applications via data-access APIs may be considered sensitive. The term "sensitive information," as used herein, may refer to any information that a user and/or organization may not want sent outside of a computing device without knowledge and/or permission of the user and/or organization. Examples of sensitive information may include, without limitation, a name, a phone number, a device identifier, an email address, a contact, a browser history, a browser cookie, a phone history, a message history, location information (e.g., global positioning system information), financial information (e.g., credit card numbers, bank account numbers, etc.), confidential information, privileged information, personal information (e.g., a social security number, a driver's license number, etc.), sensitive corporate information (e.g., intellectual property, customer lists, product roadmaps, etc.), and/or any other type of sensitive information or personally identifiable information.

Many computing platforms may require applications to have permission to use data-access APIs or data-transfer APIs. As used herein, the term "permission" may refer to any permission, privilege, designated access right, and/or authentication for accessing, sharing, using, manipulating, viewing, and/or transferring information via an application programming interface. In some examples, permissions may be granted by a user at the time of installation of an application. For example, some computing platforms may be configured to display one or more permissions required and/or used by an application and may require the user to grant the permissions to the application before installing and/or executing the application.

Returning to FIG. 3, application-identifying module 104 may identify applications in any of a variety of ways. In some examples, application-identifying module 104 may identify an application within a repository of applications (e.g., a repository of untested and/or untrusted applications). Additionally or alternatively, application-identifying module 104 may identify an application while monitoring applications presented by and/or made available through an application store or marketplace (e.g., GOOGLE PLAY, AMAZON APP STORE, etc.). In some examples, application-identifying module 104 may identify an application by receiving the application from a mobile computing device (e.g., for testing before installation).

In some examples, application-identifying module 104 may identify an application as or before it is downloaded to a computing device (e.g., via an application-marketplace application, an email, or a website). For example, application-identifying module 104 may, as part of computing device 202, identify application 216 as it is downloaded to computing device 202.

In some examples, application-identifying module 104 may identify an application in response to a request to install the application. In another example, application-identifying module 104 may identify an application as a user views information about the application (e.g., using an application-marketplace application, such as GOOGLE PLAY). In at least one example, application-identifying module 104 may identify an application that is installed and/or executing on a computing device.

In some examples, application-identifying module 104 may identify applications that may be capable of leaking sensitive information outside of a computing system via a data-access API and/or a data-transfer API and/or capable of performing other malicious actions via a sensitive data-access API (e.g., a data-access API that is known to be used to perform malicious actions) and/or a sensitive data-transfer API (e.g., a data-transfer API that is known to be used to perform malicious actions). In one example, application-identifying module 104 may identify applications that may be capable of leaking sensitive information and/or performing other malicious actions by determining that the application requires access to and/or permission to use certain predefined data-access APIs (e.g., one or more of data-access APIs 122) and/or certain predefined data-transfer APIs (e.g., one or more of data-transfer APIs 124). In one example, application-identifying module 104 may determine that an application requires access to and/or permission to use a data-access API or a data-transfer API by examining a manifest file of the application.

At step 304, one or more of the systems described herein may identify an entry-point function of the application whose execution results in a call to the data-access API and/or a call to the data-transfer API. For example, function-identifying module 106 may, as part of analyzing system 206 or computing device 202, identify an entry-point function of application 216 whose execution results in a call to data-access API 212 and/or data-transfer API 214.

As used herein, the term "entry-point function" may refer to any method, function, procedure, operation, routine, and/or subroutine of an application whose execution directly or indirectly results in a call to a data-access API and/or a data-transfer API. The term "entry-point function" may also refer to any function that acts as a point of entry into an application such as a callback method or an event listener. For example, the term "entry-point function" may refer to functions (e.g., lifecycle functions) that act as entry points into the activity, service, and/or receiver components of the ANDROID framework. Examples of entry-point functions of the ANDROID framework include, without limitation, "onCreate," "onStart," "onReceive," "onPause," "onResume," "onStop," "onDestroy," "onRestart," "onBind," "onUnbind," "onClick," "onLongClick," "onTouch," "onitemClick," "onCheckedChanged," "onDrag," "onFocusChange," "onScroll," and "onDoubleTap."

Function-identifying module 106 may identify entry-point functions of an application whose execution results in a call to a data-access API and/or a call to a data-transfer API in any suitable manner. In general, function-identifying module 106 may analyze the computer-readable instructions that make up an application to identify entry-point functions of the application whose execution may result in a call to a data-access API and/or a call to a data-transfer API. In at least one example, function-identifying module 106 may identify entry-point functions of an application by performing (e.g., without executing the application) a static data-flow and/or control flow analysis on the application.

In some examples, function-identifying module 106 may, as part of performing a data-flow and/or control-flow analysis on an application, build a data-flow graph and/or a control-flow graph of the application that may (1) include the entry-point functions of the application and any calls to data-access APIs or data-transfer APIs and (2) indicate whether execution of any of the entry-point functions of the application result in the calls to the data-access APIs or the data-transfer APIs. Using FIGS. 4 and 5 as an example, function-identifying module 106 may, as part of performing a data-flow and/or control-flow analysis of application 216, build exemplary graph 400 in FIG. 4 and/or exemplary graph 500 in FIG. 5.

As used herein, the terms "data-flow graph" and "control-flow graph" generally refer to any logical, topological, and/or graphical representation of one or more data flows and control flows of an application, respectively. In general, a data-flow graph may capture how data flows from one function to another during execution of one or more applications. For example, a data-flow graph may capture how data flows from one function of an application to another function of the application, how data flows from one function of an application to a function of another application, how data flows from a data-access API, and/or how data flows to a data-transfer API. In some examples, data-flow graphs may capture data-flow paths through which sensitive information may be leaked. A data-flow path through which sensitive information may be leaked may be referred to as a leak path. In at least one example, the term "leak path" may refer to any data-flow path from a data-access API to a data-transfer API through which sensitive information may be leaked.

In general, a control-flow graph may capture how control flows from one function to another during execution of one or more applications and/or how functions call one another. For example, a control-flow graph may capture how one function of an application calls another function of the application, how one function of an application calls a function of another application, and/or how a function of an application calls a data-access API or a data-transfer API.

Figure 4:
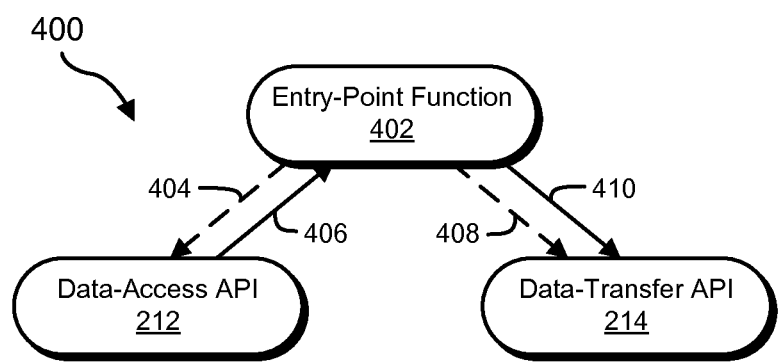
FIG. 4 is an illustration of an exemplary data-flow graph for detecting suspicious applications based on how entry-point functions are triggered.

FIG. 4 illustrates a portion of an exemplary graph 400 of application 216 in FIG. 2 that contains data-flow and control-flow information. As shown in FIG. 4, graph 400 indicates that execution of entry-point function 402 may result in a call to data-access API 212 and a call to data-transfer API 214. In this example, directed edges 404 and 408 may indicate that entry-point function 402 may, if executed, call data-access API 212 and data-transfer API 214. As shown, graph 400 also illustrates that execution of entry-point function 402 may result in a leak path that includes data-access API 212 and data-transfer API 214. In this example, directed edges 406 and 410 may indicate that execution of entry-point function 402 may result in sensitive data being leaked along the leak path that includes data-access API 212, entry-point function 402, and data-transfer API 214.

Figure 5:
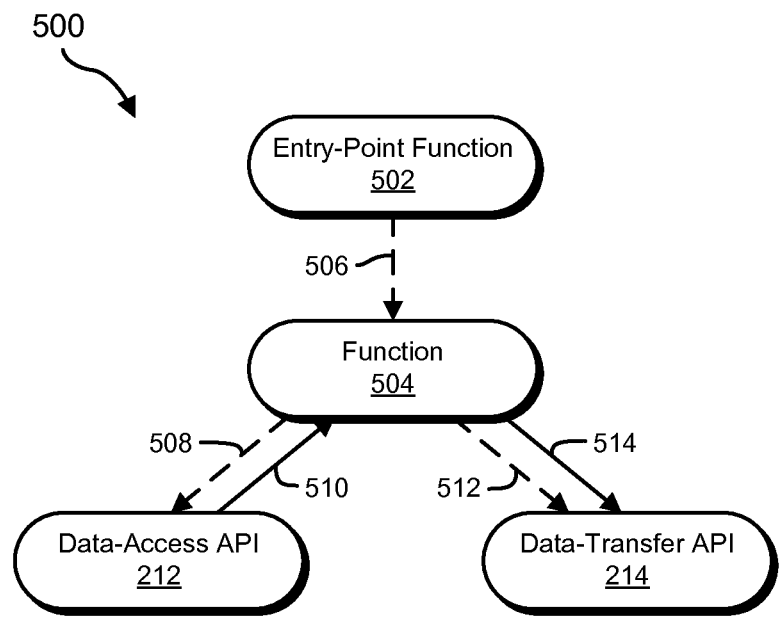
FIG. 5 is an illustration of an exemplary data-flow graph for detecting suspicious applications based on how entry-point functions are triggered.

FIG. 5 illustrates a portion of an exemplary graph 500 of application 216 in FIG. 2 that contains data-flow and control-flow information. As shown in FIG. 5, graph 500 indicates that execution of entry-point function 502 may result in a call to function 504 and that execution of function 504 may result in a call to data-access API 212 and a call to data-transfer API 214. In this example, directed edge 506 may indicate that entry-point function 502 may, if executed, call function 504, and directed edges 508 and 512 may indicate that function 504 may, if executed, call data-access API 212 and data-transfer API 214. As shown, graph 500 also illustrates that execution of function 504 may result in a leak path that includes data-access API 212 and data-transfer API 214. In this example, directed edges 510 and 514 may indicate that execution of function 504 may result in sensitive data being leaked along the leak path that includes data-access API 212, function 504, and data-transfer API 214.

Returning to FIG. 3, function-identifying module 106 may build data-flow graphs and/or control-flow graphs using any suitable data-flow or control-flow profiler. For example, function-identifying module 106 may build data-flow and/or control-flow graphs for ANDROID applications using IBM's T. J. WATSON LIBRARIES FOR ANALYSIS (WALA). In at least one example, function-identifying module 106 may convert an application into a suitable form for use by a data-flow or control-flow profiler. For example, function-identifying module 106 may convert an ANDROID application into JAVA source code so that WALA may be used to perform a data-flow and/or control-flow analysis of the ANDROID application.

Upon building a data-flow graph and/or a control-flow graph, function-identifying module 106 may analyze the data-flow graph and/or the control-flow graph to determine that execution of an entry-point function results in a call to a data-access API, a call to a data-transfer API, and/or a leak path from the data-access API to the data-transfer API. In some examples, function-identifying module 106 may use a data-flow graph and/or a control-flow graph to determine that the execution of an entry-point function results in a call to a data-access API by (1) identifying a call to the data-access API within the data-flow graph and/or the control-flow graph and by (2) backtracking the control-flow information contained within the data-flow graph and/or the control-flow graph from the call to the data-access API to the entry-point function.

Using FIG. 4 as an example, function-identifying module 106 may use graph 400 to determine that execution of entry-point function 402 results in a call to data-access API 212 by (1) identifying the call to data-access API 212 represented by directed edge 404 and (2) backtracking the control-flow information contained within graph 400 (e.g., directed edge 404) to entry-point function 402. Using FIG. 5 as another example, function-identifying module 106 may use graph 500 to determine that execution of entry-point function 502 results in a call to data-access API 212 by (1) identifying the call to data-access API 212 represented by directed edge 508 and (2) backtracking the control-flow information contained within graph 500 (e.g., directed edge 508 and 506) to entry-point function 502. Function-identifying module 106 may use a similar method to determine that execution of an entry-point function results in a call to a data-transfer API and/or that execution of an entry-point function results in both of a call to a data-access API and a call to a data-transfer API.

In some examples, Function-identifying module 106 may use a data-flow graph and/or a control-flow graph to determine that the execution of an entry-point function results in a leak path from a data-access API to a data-transfer API by (1) identifying a leak path within the data-flow graph and/or the control-flow graph and (2) backtracking the control-flow information contained within the data-flow graph and/or the control-flow graph from the leak path to the entry-point function. Using FIG. 4 as an example, function-identifying module 106 may use graph 400 to determine that execution of entry-point function 402 results in a leak path from data-access API 212 to data-transfer API 214 by (1) identifying the leak path represented by directed edges 406 and 408 and (2) backtracking the control-flow information contained within graph 500 (e.g., directed edge 404 and/or directed edge 408) to entry-point function 402. Using FIG. 5 as another example, function-identifying module 106 may use graph 500 to determine that execution of entry-point function 502 results in a leak path from data-access API 212 to data-transfer API 214 by (1) identifying the leak path represented by directed edges 510 and 514 and by (2) backtracking the control-flow information contained within graph 500 (e.g., directed edge 508, 512, and/or 506) to entry-point function 502.

At step 306, one or more of the systems described herein may determine how the entry-point function identified as part of step 304 is triggered. For example, trigger-determining module 108 may determine how an entry-point function of application 216 (e.g., entry-point function 402 in FIG. 4 or entry-point function 502 in FIG. 5) is triggered. As will be explained in greater detail below, how an entry-point function whose execution may result in a call to a sensitive data-access API, a sensitive data-transfer API, or a leak path is triggered may be indicative of whether the application that includes the entry-point function is or is not likely to be malicious.

Trigger-determining module 108 may determine how an entry-point function is triggered in any suitable manner. In one example, trigger-determining module 108 may determine how an entry-point function is triggered by identifying a trigger-type classification associated with the entry-point function. In one example, trigger-determining module 108 may identify a trigger-type classification associated with an entry-point function by querying database 120 for the trigger-type classification.

In some examples, trigger-type classifications may be predefined. In one example, known entry-point functions may be classified as either user-initiated functions or automatically-initiated functions. As used herein, the term "user-initiated function" may refer to any function that is triggered in response to a user's interaction with an application. Accordingly, as used herein, the term "automatically-initiated function" may refer to any function that may not be triggered in response to a user's interaction with an application. Examples of entry-point functions of the ANDROID framework that may be classified as user-initiated functions include, without limitation, "onClick," "onLongClick," "onTouch," "onitemClick," "onCheckedChanged," "onDrag," "onFocusChange," "onScroll," and "onDoubleTap." Examples of entry-point functions of the ANDROID framework that may be classified as automatically-initiated functions include, without limitation, "onCreate," "onStart," "onReceive," "onPause," "onResume," "onStop," "onDestroy," "onRestart," "onBind," and "onUnbind."

In some examples, trigger-determining module 108 may associate a trigger-type classification with an entry-point function based on how the entry-point function is triggered and/or other attributes of the entry-point function. For example, trigger-determining module 108 may classify an entry-point function as a user-initiated function if the entry-point function is triggered in response to a user's interaction with an application. Additionally or alternatively, trigger-determining module 108 may classify an entry-point function as an automatically-initiated function if the entry-point function may not be triggered in response to a user's interaction with an application.

At step 308, one or more of the systems described herein may determine whether the application identified as part of step 302 is suspicious based on how the entry-point function identified as part of step 304 is triggered. For example, suspicion-determining module 110 may determine whether application 216 is suspicious by determining whether entry-point function 402 in FIG. 4 and/or entry-point function 502 in FIG. 5 is a user-initiated function or an automatically initiated function.

Suspicion-determining module 110 may determine whether an application is suspicious using any suitable combination of criteria. For example, suspicion-determining module 110 may determine that an application is or is not suspicious based solely on the trigger-type classification of one or more entry-point functions of the application whose execution may result in a call to a data-access API, a call to a data-transfer API, and/or a leak path.

In some instances, the fact that the execution of an entry-point function that is classified as an automatically-initiated function may result in a call to a data-access API, a call to a data-transfer API, and/or a leak path may indicate that users may be unaware of the call to the data-access API, the call to the data-transfer API, the leak path, and/or the possibility that the application that includes the entry-point function may leak sensitive information and/or perform other malicious behaviors. As such, suspicion-determining module 110 may consider any application as suspicious if any entry-point function of the application whose execution may result in a call to a data-access API, a call to a data-transfer API, and/or a leak path is an automatically-initiated function.

In some instances, the fact that the execution of an entry-point function that is classified as an user-initiated function may result in a call to a data-access API, a call to a data-transfer API, and/or a leak path may indicate that users may be aware of the call to the data-access API, the call to the data-transfer API, and/or the leak path. As such, suspicion-determining module 110 may consider any application as not suspicious if any entry-point function of the application whose execution may result in a call to a data-access API, a call to a data-transfer API, and/or a leak path is a user-initiated function.

In some examples, suspicion-determining module 110 may also determine whether an application is suspicious based on prevalence data relating to the application (e.g., data that indicates the number of devices on which the application is installed), release data relating to the application (e.g., data indicating that the application was or was not recently released), reputation data relating to the application (e.g., information that indicates that the application is or is not on a whitelist of trusted applications), permission data relating to the application (e.g., data that indicates that the application requires or does not require access to a large number of sensitive APIs), heuristic analysis (e.g., determine that one or more additional behaviors of the application are suspect), and/or any other suitable information or method useful in identifying suspicious applications.

At step 310, one or more of the systems described herein may perform a security action based on whether the application identified as part of step 302 is suspicious. For example, security module 112 may perform a security action after determining that application 216 is suspicious.

Security module 112 may perform security actions in a variety of ways. In general, security module 112 may perform a security action on an application in response to determining that the application is suspicious. For example, security module 112 may label the application as suspicious. Additionally or alternatively, security module 112 may classify the application as malware or grayware if the application is sufficiently suspicious. As used herein, the term "malware" may refer to any virus, worm, Trojan horse, spyware, and/or any other malicious, illegitimate, and/or unauthorized software and/or data object. The term "grayware" may refer to any potentially unwanted applications.

In some examples, security module 114 may perform a security action on a suspicious application by preventing an installation of the application, by uninstalling the application, by notifying a user who has installed or is attempting to install the application that the application is potentially malicious and/or that the application may leak the user's sensitive information without the user interacting with the application, and/or by notifying a third-party (e.g., an application-marketplace provider or a security vendor) that the application is potentially malicious. Upon completion of step 310, exemplary method 300 in FIG. 3 may terminate.

As explained above, by analyzing how entry-point functions whose execution may result in sensitive information leaks and/or other malicious behaviors are triggered, the systems and methods described herein may efficiently and effectively detect malware and/or grayware. For example, the systems and methods described herein may determine that an application is or is likely malware or grayware by determining that one or more of the application's entry-point functions are not triggered in response to a user interacting with the application and may, when executed, result in sensitive information being leaked and/or other malicious behaviors being performed by the application. In another example, the systems described herein may determine that an application is or is likely malware or grayware by (1) constructing a data-flow graph of the application, (2) using the data-flow graph of the application to determine that the application is capable of leaking sensitive information and/or performing other malicious actions via a data-access API programmed to provide access to sensitive information located on a computing system and/or a data-transfer API programmed to send information outside of the computing system, (3) using the data-flow graph of the application to identify any entry-point functions of the application whose execution may directly or indirectly result in a call to the data-access API and/or the data-transfer API, and (4) determining that one or more of the identified entry-point functions are triggered automatically instead of in response to user interaction.

Figure 6:
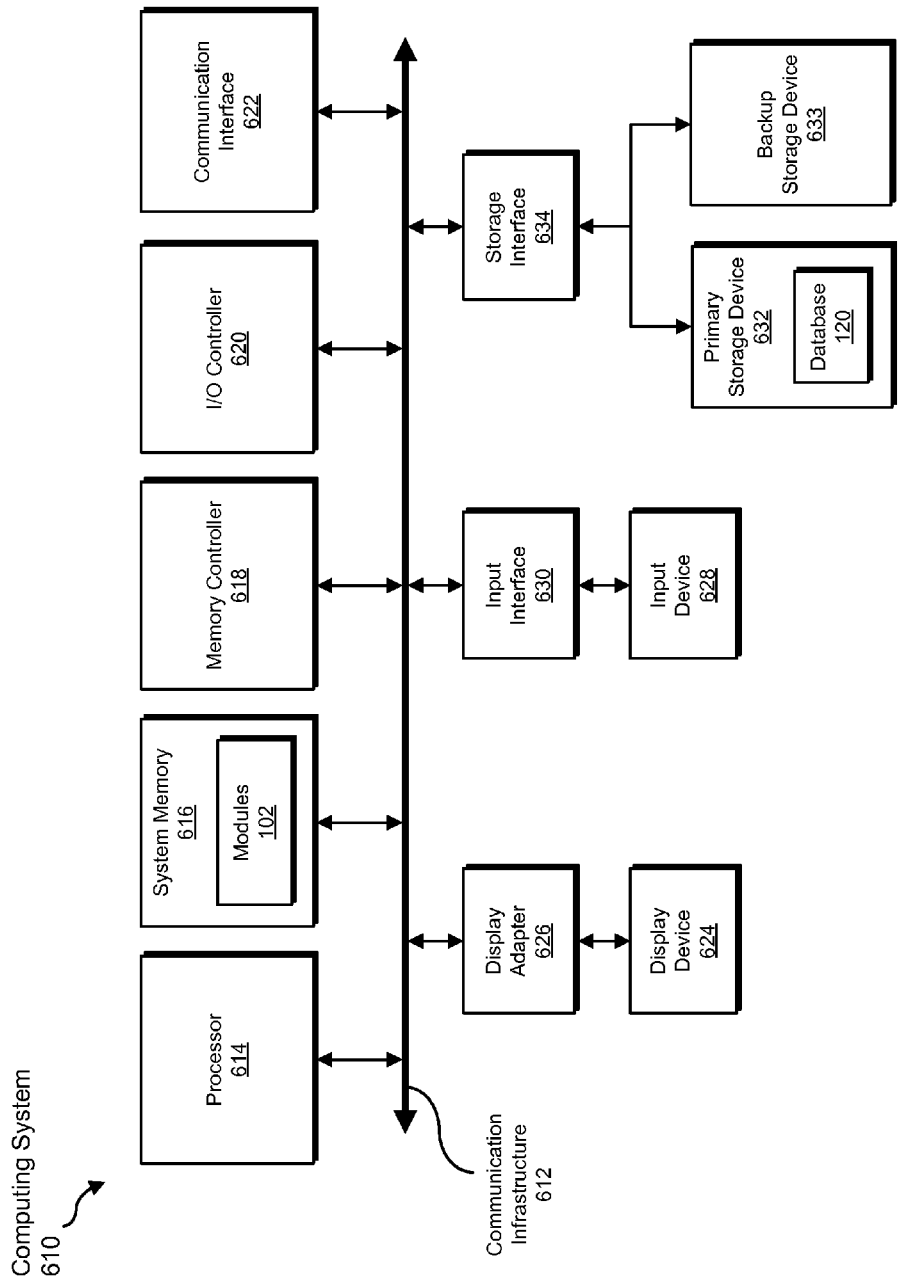
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
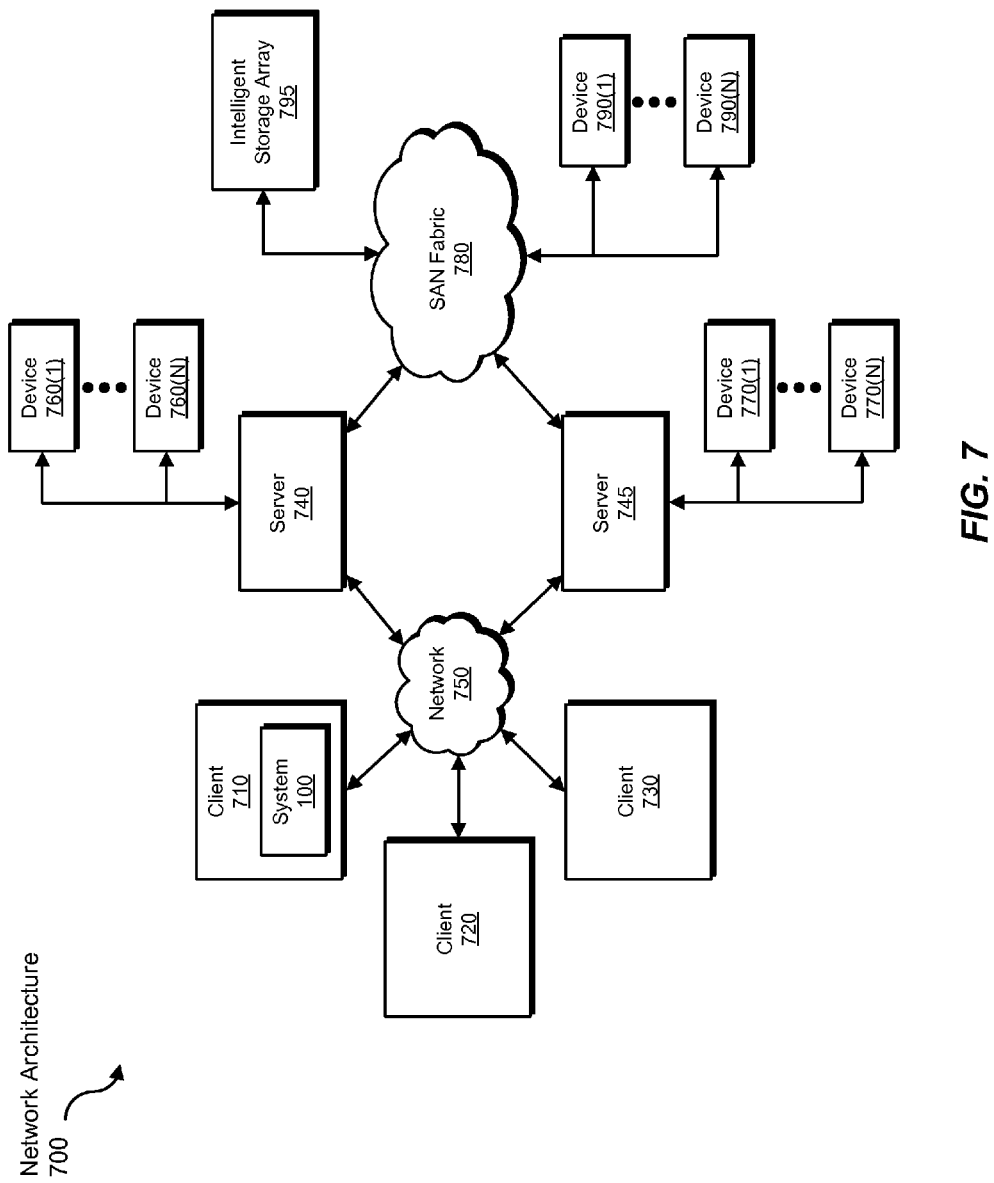
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting suspicious applications based on how entry-point functions are triggered.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an application to be transformed, transform the application into a data-flow graph that may be used to detect suspicious applications based on how entry-point functions of the application are triggered, output a result of the transformation to a system that detects suspicious applications based on how entry-point functions are triggered, use the result of the transformation to determine that the application is suspicious, and store the result of the transformation to a storage system that stores information about malicious, suspicious, and/or benign applications. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A computer-implemented method for detecting suspicious applications based on how entry-point functions are triggered, at least a portion of the method being performed by a computing device comprising at least one processor, the method comprising:
   identifying an application that is capable of accessing:
      a data-access Application Programming Interface (API) programmed to provide access to sensitive information located on a computing system; and
      a data-transfer API programmed to send information outside of the computing system;
   identifying, as part of statically analyzing the application before the application is executed, an entry-point function that acts as a point of entry into the application whose execution results in a call to at least one of:
      the data-access API; and
      the data-transfer API;
   determining, as part of statically analyzing the application before the application is executed, that the entry-point function is a type of function that is not triggered in response to a user's interaction with the application;
   determining, as part of statically analyzing the application before the application is executed based at least in part on determining that the entry-point function is the type of function that is not triggered in response to a user's interaction with the application, that the application is suspicious; and
   performing, in response to determining that the application is suspicious, a security action.

2. The method of claim 1, wherein identifying the entry-point function comprises:
   building, without executing the application, a data-flow graph that comprises a leak path from the data-access API to the data-transfer API;
   analyzing the data-flow graph to determine that execution of the entry-point function results in the leak path from the data-access API to the data-transfer API.

3. The method of claim 1, wherein:
   identifying the application comprises determining that the application is capable of leaking sensitive information outside of the computing system via the data-access API and the data-transfer API;
   identifying the entry-point function comprises determining that the execution of the entry-point function results in a call to both of the data-access API and the data-transfer API.

4. The method of claim 1, wherein determining that the entry-point function is the type of function that is not triggered in response to a user's interaction with the application comprises identifying a predetermined trigger-type classification of the entry-point function that indicates that the entry-point function is not triggered in response to a user's interaction with the application.

5. The method of claim 4, wherein identifying the predetermined trigger-type classification of the entry-point function comprises determining that the entry-point function is included in a predetermined list of automatically-initiated functions.

6. The method of claim 1, wherein the entry-point function comprises at least one of:
   a callback method;
   an event listener; and
   an application-lifecycle function.

7. The method of claim 6, wherein performing the security action comprises labeling the application as suspicious.

8. The method of claim 6, wherein performing the security action comprises informing a user that the application may leak the user's sensitive information without the user interacting with the application.

9. The method of claim 1, wherein the steps of identifying the entry-point function and determining that the entry-point function is the type of function that is not triggered in response to a user's interaction with the application are performed as part of a static data-flow analysis of the application.

10. The method of claim 1, wherein:
    the data-access API comprises at least one of:
      an account access API;
      a browser-bookmark access API;
      a browser-history access API;
      a calendar access API;
      a camera access API;
      a contact access API;
      a location access API;
      a message access API;
      an external-storage access API;
      a microphone access API;
      a phone-call access API;
    the data-transfer API comprises at east one of:
      a message transfer API;
      a network transfer API;
      a phone-call transfer API.

11. A system for detecting suspicious applications based on how entry-point functions are triggered, the system comprising:
   an application-identifying module, stored in memory, that identifies an application that is capable of accessing:
      a data-access Application Programming Interface (API) programmed to provide access to sensitive information located on a computing device; and
      a data-transfer API programmed to send information outside of the computing device;
   a function-identifying module, stored in memory, that identifies, as part of statically analyzing the application before the application is executed, an entry-point function that acts as a point of entry into the application whose execution results in a call to at least one of:
      the data-access API; and
      the data-transfer API;
   a trigger-determining module, stored in memory, that determines, as part of statically analyzing the application before the application is executed, that the entry-point function is a type of function that is not triggered in response to a user's interaction with the application;
   a suspicion-determining module, stored in memory, that determines, as part of statically analyzing the application before the application is executed, that the application is suspicious based at least in part on a determination that the entry-point function is the type of function that is not triggered in response to a user's interaction with the application;
   a security module, stored in memory, that performs a security action in response to a determination that the application is suspicious; and
   at least one hardware processor that executes the application-identifying module, the function-identifying module, the trigger-determining module, the suspicion-determining module, and the security module.

12. The system of claim 11, wherein the function-identifying module identifies the entry-point function by:

building, without executing the application, a data-flow graph that comprises a leak path from the data-access API to the data-transfer API;

analyzing the data-flow graph to determine that execution of the entry-point function results in the leak path from the data-access API to the data-transfer API.

13. The system of claim 11, wherein:

the application-identifying module identifies the application by determining that the application is capable of leaking sensitive information outside of the computing device via the data-access API and the data-transfer API;

the function-identifying module identifies the entry-point function by determining that the execution of the entry-point function results in a call to both of the data-access API and the data-transfer API.

14. The system of claim 11, wherein the trigger-determining module determines that the entry-point function is the type of function that is not triggered in response to a user's interaction with the application by identifying a predetermined trigger-type classification of the entry-point function that indicates that the entry-point function is not triggered in response to a user's interaction with the application.

15. The system of claim 14, wherein the trigger-determining module identifies the predetermined trigger-type classification of the entry-point function by determining that the entry-point function is included in a predetermined list of automatically-initiated functions.

16. The system of claim 11, wherein the entry-point function comprises at least one of:

a callback method;

an event listener; and an application-lifecycle function.

17. The system of claim 16, wherein the security module performs the security action by labeling the application as suspicious.

18. The system of claim 16, wherein the security module performs the security action by informing a user that the application may leak the user's sensitive information without the user interacting with the application.

19. The system of claim 11, wherein the entry-point function-identifying module identifies the entry-point function and the trigger-determining module determines that the entry-point function is the type of function that is not triggered in response to a user's interaction with the application as part of a static data-flow analysis of the application.

20. A non-transitory computer-readable medium comprising one or more computer-executable instructions that, when executed by at least one processor of a computing device, cause the computing device to:

identify an application that is capable of accessing:

a data-access Application Programming Interface (API) programmed to provide access to sensitive information located on a computing system; and a data-transfer API programmed to send information outside of the computing system;

identify, as part of statically analyzing the application before the application is executed, an entry-point function that acts as a point of entry into the application whose execution results in a call to at least one of:

the data-access API; and the data-transfer API;

determine, as part of statically analyzing the application before the application is executed, that the entry-point function is a type of function that is not triggered in response to a user's interaction with the application;

determine, as part of statically analyzing the application before the application is executed based at least in part on determining that the entry-point function is the type of function that is not triggered in response to a user's interaction with the application that the application is suspicious; and perform, in response to determining that the application is suspicious, a security action.

* * * * *

UNITED STATES PATENT AND TRADEMARK OFFICE
CERTIFICATE OF CORRECTION

PATENT NO. : 9,852,294 B1
APPLICATION NO. : 14/313739
DATED : December 26, 2017
INVENTOR(S) : Zhu Page 1 of 1

It is certified that error appears in the above-identified patent and that said Letters Patent is hereby corrected as shown below:

In the Claims

In Column 22, Line 26, in Claim 10, delete "at east one" and insert -- at least one --, therefor.

In Column 24, Line 34, in Claim 20, delete "application that" and insert -- application, that --, therefor.

Signed and Sealed this
First Day of May, 2018

Andrei Iancu
*Director of the United States Patent and Trademark Office*